UNITED STATES PATENT OFFICE.

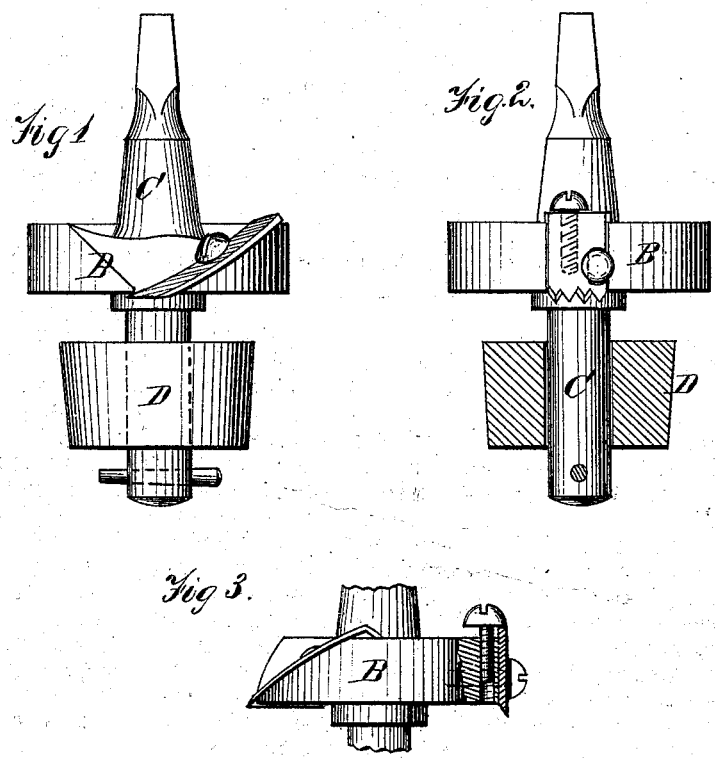

TREAT T. PROSSER AND GEORGE W. GILLETTE, OF CHICAGO, ILLINOIS.

IMPROVEMENT IN TOOLS FOR FACING BUNG-HOLES.

Specification forming part of Letters Patent No. 135,843, dated February 11, 1873.

*To all whom it may concern:*

Be it known that we, TREAT T. PROSSER and GEORGE W. GILLETTE, of Chicago, in the county of Cook and State of Illinois, have invented a certain Improvement in Tools for Facing Bung-Holes for the Reception of Bung-Bushes, of which the following is a specification:

Metallic bung-bushes as now extensively used have a circumferential flange around one end to compress a packing-ring which is placed under it in a seat or recess cut in the stave around the bung-hole.

This invention, relating to a tool for cutting this seat or recess in the stave, consists in combining with the lower end of the stem or spindle upon which the cutter-head is fastened a loose plug in the shape of a bung, which, in the practical application of the tool, is driven down into the bung-hole, and serves as a bearing for the spindle of the cutter, so that the latter may without failure cut the seat plumb or at right angles to the axis of the bung-hole, thus insuring the even compression at all points of the packing-ring on screwing the bush down upon it.

Figure 1 is an elevation of our improved tool. Fig. 2 is a sectional elevation thereof. Fig. 3 is a detail view of the cutter-head.

The same letters of reference are employed in all the figures in designating identical parts.

The cutter-head B, which is furnished with the usual spur and a planing-chisel, is firmly secured to the spindle C, which is squared at its upper end, and may be rotated by means of an ordinary brace or by other means. The lower projecting end of the spindle is accurately fitted to a metallic plug, D, which resembles a bung in outline, and is of such diameter that it may be driven down into an ordinary-sized bung-hole until its upper end is sufficiently below the exterior surface of the stave to permit of the cutting of the seat therein by the cutter. The plug thus inserted centers and serves as a bearing for the cutter-spindle.

What we claim, and desire to secure by Letters Patent, is—

The combination of the cutter B, stem or spindle C, and plug D, substantially as and for the purpose specified.

In testimony whereof we have signed our names to this specification in the presence of two subscribing witnesses.

T. T. PROSSER.
G. W. GILLETTE.

Witnesses:
JNO. P. LYDIARD,
PARKE B. CHASE.